US012538073B2

(12) United States Patent
Dick et al.

(10) Patent No.: US 12,538,073 B2
(45) Date of Patent: Jan. 27, 2026

(54) WIND NOISE REDUCTION, FLEXIBLE BEAMFORMING, AND DIRECTION OF ARRIVAL ESTIMATION BY MICROPHONE PLACEMENT

(71) Applicant: GoPro, Inc., San Mateo, CA (US)

(72) Inventors: Timothy Dick, San Francisco, CA (US); Eric Steven Penrod, Brentwood, CA (US); Erich Tisch, San Francisco, CA (US)

(73) Assignee: GoPro, Inc., San Mateo, CA (US)

( * ) Notice: Subject to any disclaimer, the term of this patent is extended or adjusted under 35 U.S.C. 154(b) by 223 days.

(21) Appl. No.: 18/218,840

(22) Filed: Jul. 6, 2023

(65) Prior Publication Data

US 2024/0015433 A1 Jan. 11, 2024

Related U.S. Application Data

(60) Provisional application No. 63/358,986, filed on Jul. 7, 2022.

(51) Int. Cl.
*H04R 3/00* (2006.01)
*H04R 1/02* (2006.01)
(Continued)

(52) U.S. Cl.
CPC ............ *H04R 3/005* (2013.01); *H04R 1/028* (2013.01); *H04R 1/406* (2013.01); *H04R 29/005* (2013.01);
(Continued)

(58) Field of Classification Search
CPC ........ H04R 3/005; H04R 1/028; H04R 1/406; H04R 29/005; H04R 2499/11
(Continued)

(56) References Cited

U.S. PATENT DOCUMENTS 7,660,428 B2 * 2/2010 Rodman ................ H04R 1/025 381/355
7,660,754 B1 * 2/2010 Willis .................... G06Q 40/00 705/34

(Continued)

OTHER PUBLICATIONS

Khaddour, Hasan, Jiri Schimmel, and Michal Trzos. "Estimation of direction of arrival of multiple sound sources in 3d space using b-format." International Journal of Advances in Telecommunications, Electrotechnics, Signals and Systems 2.2 (2013): 63-67.

(Continued)

*Primary Examiner* — Disler Paul
(74) *Attorney, Agent, or Firm* — Young Basile Hanlon & MacFarlane, P.C.

(57) ABSTRACT

An image capture device includes a housing, a processor, and three or more microphones. The housing includes a forward wall including a sensor, a rearward wall located opposite the forward wall, and a top wall connecting the forward wall and the rearward wall. The three or more microphones are configured to capture sound. The three or more microphones include a first microphone, a second microphone, and a third microphone. The processor is configured to receive the sound from the three or more microphones and to estimate a direction of arrival, reduce or remove wind noise, perform beamforming, or a combination thereof. The first microphone is located on or within the forward wall, the second microphone is located on or within the top wall, and the third microphone is located on or within the top wall and spaced apart from the second microphone.

20 Claims, 9 Drawing Sheets

(51) Int. Cl.
*H04R 1/40* (2006.01)
*H04R 29/00* (2006.01)

(52) U.S. Cl.
CPC .... *H04R 2201/401* (2013.01); *H04R 2410/01* (2013.01); *H04R 2410/07* (2013.01); *H04R 2430/03* (2013.01); *H04R 2499/11* (2013.01)

(58) Field of Classification Search
USPC .............................................. 381/91–91, 122
See application file for complete search history.

(56) References Cited

U.S. PATENT DOCUMENTS

| | | | | |
|---|---|---|---|---|
| 10,142,741 | B2 * | 11/2018 | Aubreville | H04R 25/552 |
| 11,295,646 | B2 * | 4/2022 | Li | G09G 3/36 |
| 11,295,754 | B2 * | 4/2022 | Eubank | G10L 21/0272 |
| 11,483,646 | B1 * | 10/2022 | Pan | H04R 3/005 |
| 11,943,604 | B2 * | 3/2024 | Eronen | H04R 3/005 |
| 2017/0365255 | A1 * | 12/2017 | Kupryjanow | G10L 25/51 |
| 2018/0176687 | A1 * | 6/2018 | Young | H04N 23/60 |
| 2024/0298111 | A1 * | 9/2024 | Johnson | H04R 29/005 |

OTHER PUBLICATIONS

Wasim Muklashy, “Review: the GoPro Fusion is a different kind of action camera: Digital Photography Review”, published Aug. 15, 2018, https://www.dpreview.com/reviews/review-the-gopro-fusion-is-a-different-kind-of-action-camera, 7 pages.

* cited by examiner

WIND NOISE REDUCTION, FLEXIBLE BEAMFORMING, AND DIRECTION OF ARRIVAL ESTIMATION BY MICROPHONE PLACEMENT

CROSS-REFERENCE TO RELATED APPLICATION(S)

This application claims priority to and the benefit of U.S. Provisional Application Patent Ser. No. 63/358,986, filed Jul. 7, 2022, the entire disclosure of which is hereby incorporated by reference.

TECHNICAL FIELD

This disclosure relates to an image capture device including three or more microphones that are located on or within the image capture device and are configured to determine and compensate for wind noise reduction, flexible beamforming, and direction of arrival estimation.

BACKGROUND

Image capture device continue to become more sophisticated. Image capture devices capture still image and videos. The videos can be recorded with sound so that the events can be played back at a later date. However, when these devices are used during sporting events or outside the sounds may become distorted due to wind noise or movements related to the user.

SUMMARY

Disclosed herein are implementations of an image capture device that includes a housing, a processor, and three or more microphones. The housing includes a forward wall including a sensor, a rear wall located opposite the forward wall, and a top wall connecting the forward wall and the rear wall. The three or more microphones are configured to capture sound. The three or more microphones include a first microphone, a second microphone, and a third microphone. The processor is configured to receive the sound from the three or more microphones and to estimate a direction of arrival, reduce or remove wind noise, perform beamforming, or a combination thereof. The first microphone is located on or within the forward wall, the second microphone is located on or within the rear wall, and the third microphone is located on or within the top wall and spaced apart from the second microphone.

The present teachings provide an image capture device including a housing, three or more microphones, and a processor. The three or more microphones are configured to capture sound. The processor configured to: monitor sounds captured by the three or more microphones; divide the sounds captured by each of the three or more microphones into individual frequency bands; estimate an azimuth and elevation for the individual frequency bands; calculate angles for the individual frequency bands of the three microphones; and estimate a direction of arrival of the sounds captured by the three or more microphones.

The present teachings provide a method that includes monitoring microphones, applying beam forming, reducing wind noise, and estimating a direction of arrival. The step of monitoring three or more microphones is provided in an image capture device. The step of applying beamforming provided delays and weights to microphone signals associated with the three or more microphones based on the microphone array geometry to achieve a desired polar response. The step of reducing wind noise by switching between the three or more microphones or combining sound captured by the three or more microphones. The step of estimating a direction of arrival of the sound captured by the three or more microphones is performed.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1A:
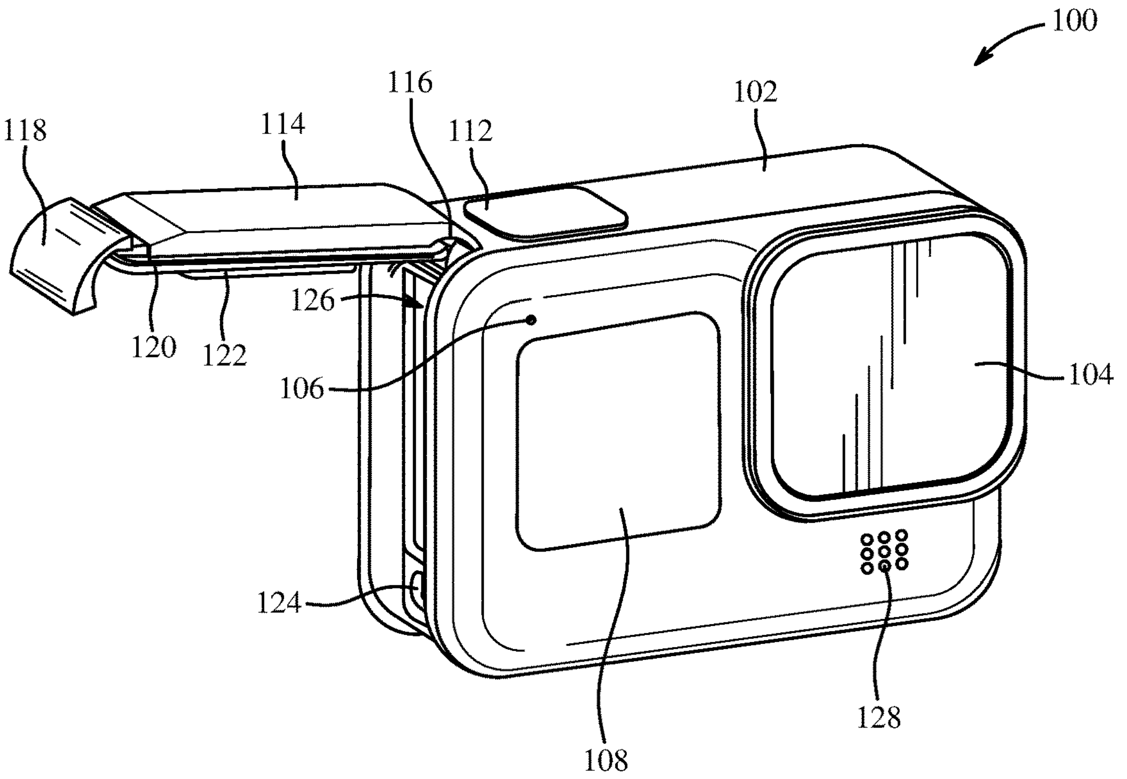
FIGS. 1A-1B are isometric views of an example of an image capture device.

The present teachings relate to an image capture device. The present teachings provide an image capture device that includes multiple microphones (e.g., three or more or even four or more). The image capture device includes a processor that is in communication with the microphones to capture audio recordings while images are being captured. The processor processes the audio via beamforming, switching between microphones, a direction of arrival estimation, or a combination thereof.

During beamforming the microphone directionality are adjusted in a specific direction (e.g., a predetermined direction or a direction of a sound). The microphone positions relative to one another are known such that when sounds are detected by the microphones the sound may be recorded so that when replayed the sound is provided in stereo. A geometry of the microphones relative to one another, that is, a microphone array geometry, may determine how the sound is captured and how the sound is emitted when played back with a recording. A geometry of the microphones that provide accurate beamforming may be subject to wind noise, make direction of arrival estimation complex, or both.

The wind noise may be monitored by the processor such that the processor may alternate between the microphones to record sound on the microphone with the least amount of wind noise. The microphones may be spaced apart so that wind hits each microphone differently. The microphones may be mounted in different surfaces. The microphones may all be mounted on a same surface. Some of the microphones may be mounted on a first surface and some of the microphones may be mounted on a second surface with at least two microphones being mounted on the first surface or the second surface. The microphones may be spaced apart so that wind contacts each microphone differently and the processor may determine which microphone receives the lowest wind noise compared to the other microphones. Sound from the microphone with a lowest wind noise may be selected. Thus, the wind noise in the sound may be substantially reduced or removed based on selecting the microphone with a lowest amount of wind noise. The processor may compare an amount of wind noise captured by each microphone and then select the microphone with a lowest amount of wind noise. The microphones may be located on or within a housing of the image capture device so that the processor is capable of reducing or eliminating wind noise while performing beamforming and direction of arrival estimation.

The direction of arrival (DOA) estimation may monitor each of the microphones individually. The DOA may separate each microphone or microphone signal into a block over time (e.g., a time block). The individual blocks may be separated into frequency sub-bands. Based on the sub-bands the processor may determine azimuth, elevation, or both. The processor may determine direction of arrival estimation based on the azimuth, elevation, changes in azimuth, changes in elevation, timing differences of arrival at each microphone, or a combination thereof. The processor may calculate angles in each block. For example, as sound reaches each microphone the angle of arrival of the sound may be determined based upon the timing differences of sound arrival at each microphone. The calculation of the angles of each block may be calculated such that the angles reported are statistically significant. For example, outliers may be removed while performing the angle calculation. Once the angles are calculated the angles may be reported to the processor, the user, or both to illustrate the direction the sound was produced.

Figure 1B:
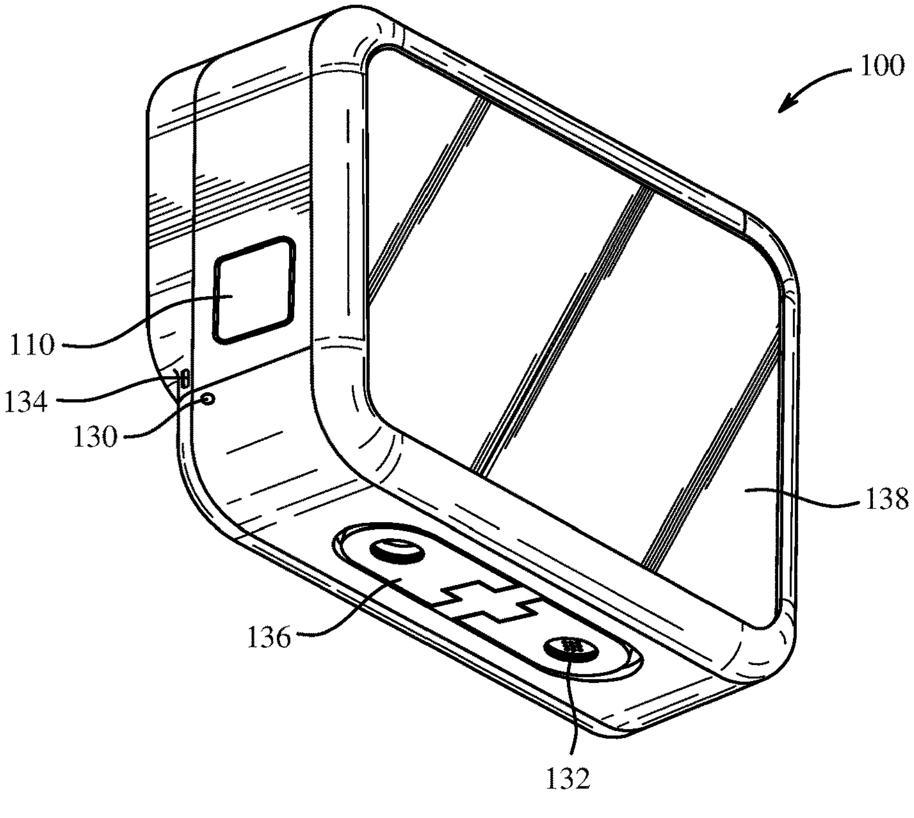

FIGS. 1A-1B are isometric views of an example of an image capture device 100. The image capture device 100 may include a body 102, a lens 104 structured on a front surface of the body 102, various indicators on the front surface of the body 102 (such as light-emitting diodes (LEDs), displays, and the like), various input mechanisms (such as buttons, switches, and/or touch-screens), and electronics (such as imaging electronics, power electronics, etc.) internal to the body 102 for capturing images via the lens 104 and/or performing other functions. The lens 104 is configured to receive light incident upon the lens 104 and to direct received light onto an image sensor internal to the body 102. The image capture device 100 may be configured to capture images and video and to store captured images and video for subsequent display or playback.

The image capture device 100 may include an LED or another form of indicator 106 to indicate a status of the image capture device 100 and a liquid-crystal display (LCD) or other form of a display 108 to show status information such as battery life, camera mode, elapsed time, and the like. The image capture device 100 may also include a mode button 110 and a shutter button 112 that are configured to allow a user of the image capture device 100 to interact with the image capture device 100. For example, the mode button 110 and the shutter button 112 may be used to turn the image capture device 100 on and off, scroll through modes and settings, and select modes and change settings. The image capture device 100 may include additional buttons or interfaces (not shown) to support and/or control additional functionality.

The image capture device 100 may include a door 114 coupled to the body 102, for example, using a hinge mechanism 116. The door 114 may be secured to the body 102 using a latch mechanism 118 that releasably engages the body 102 at a position generally opposite the hinge mechanism 116. The door 114 may also include a seal 120 and a battery interface 122. When the door 114 is an open position, access is provided to an input-output (I/O) interface 124 for connecting to or communicating with external devices as described below and to a battery receptacle 126 for placement and replacement of a battery (not shown). The battery receptacle 126 includes operative connections (not shown) for power transfer between the battery and the image capture device 100. When the door 114 is in a closed position, the seal 120 engages a flange (not shown) or other interface to provide an environmental seal, and the battery interface 122 engages the battery to secure the battery in the battery receptacle 126. The door 114 can also have a removed position (not shown) where the entire door 114 is separated from the image capture device 100, that is, where both the hinge mechanism 116 and the latch mechanism 118 are decoupled from the body 102 to allow the door 114 to be removed from the image capture device 100.

The image capture device 100 may include a microphone 128 on a front surface and another microphone 130 on a side surface. The image capture device 100 may include other microphones on other surfaces (not shown). The microphones 128, 130 may be configured to receive and record audio signals in conjunction with recording video or separate from recording of video. The image capture device 100 may include a speaker 132 on a bottom surface of the image capture device 100. The image capture device 100 may include other speakers on other surfaces (not shown). The speaker 132 may be configured to play back recorded audio or emit sounds associated with notifications.

A front surface of the image capture device 100 may include a drainage channel 134. A bottom surface of the image capture device 100 may include an interconnect mechanism 136 for connecting the image capture device 100 to a handle grip or other securing device. In the example shown in FIG. 1B, the interconnect mechanism 136 includes folding protrusions configured to move between a nested or collapsed position as shown and an extended or open position (not shown) that facilitates coupling of the protrusions to mating protrusions of other devices such as handle grips, mounts, clips, or like devices.

The image capture device 100 may include an interactive display 138 that allows for interaction with the image capture device 100 while simultaneously displaying information on a surface of the image capture device 100.

The image capture device 100 of FIGS. 1A-1B includes an exterior that encompasses and protects internal electronics. In the present example, the exterior includes six surfaces (i.e. a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described here. For example, the image capture device 100 may include additional buttons or different interface features, such as interchangeable lenses, cold shoes, and hot shoes that can add functional features to the image capture device 100.

The image capture device 100 may include various types of image sensors, such as charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors.

Although not illustrated, in various embodiments, the image capture device 100 may include other additional electrical components (e.g., an image processor, camera system-on-chip (SoC), etc.), which may be included on one or more circuit boards within the body 102 of the image capture device 100.

The image capture device 100 may interface with or communicate with an external device, such as an external user interface device (not shown), via a wired or wireless computing communication link (e.g., the I/O interface 124). Any number of computing communication links may be used. The computing communication link may be a direct computing communication link or an indirect computing communication link, such as a link including another device or a network, such as the internet, may be used.

In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links.

In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the external user interface device via the computing communication link, and the external user interface device may store, process, display, or a combination thereof the panoramic images.

The external user interface device may be a computing device, such as a smartphone, a tablet computer, a phablet, a smart watch, a portable computer, personal computing device, and/or another device or combination of devices configured to receive user input, communicate information with the image capture device 100 via the computing communication link, or receive user input and communicate information with the image capture device 100 via the computing communication link.

The external user interface device may display, or otherwise present, content, such as images or video, acquired by the image capture device 100. For example, a display of the external user interface device may be a viewport into the three-dimensional space represented by the panoramic images or video captured or created by the image capture device 100.

The external user interface device may communicate information, such as metadata, to the image capture device 100. For example, the external user interface device may send orientation information of the external user interface device with respect to a defined coordinate system to the image capture device 100, such that the image capture device 100 may determine an orientation of the external user interface device relative to the image capture device 100.

Based on the determined orientation, the image capture device 100 may identify a portion of the panoramic images or video captured by the image capture device 100 for the image capture device 100 to send to the external user interface device for presentation as the viewport. In some implementations, based on the determined orientation, the image capture device 100 may determine the location of the external user interface device and/or the dimensions for viewing of a portion of the panoramic images or video.

The external user interface device may implement or execute one or more applications to manage or control the image capture device 100. For example, the external user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the external user interface device, such as via an application, may remotely control the image capture device 100 such as in response to user input.

The external user interface device, such as via an application, may display unprocessed or minimally processed images or video captured by the image capture device 100 contemporaneously with capturing the images or video by the image capture device 100, such as for shot framing or live preview, and which may be performed in response to user input. In some implementations, the external user interface device, such as via an application, may mark one or more key moments contemporaneously with capturing the images or video by the image capture device 100, such as with a tag or highlight in response to a user input or user gesture. The external user interface device, such as via an application, may display or otherwise present marks or tags associated with images or video, such as in response to user input. For example, marks may be presented in a camera roll application for location review and/or playback of video highlights.

The external user interface device, such as via an application, may wirelessly control camera software, hardware, or both. For example, the external user interface device may include a web-based graphical interface accessible by a user for selecting a live or previously recorded video stream from the image capture device 100 for display on the external user interface device.

The external user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 2A:
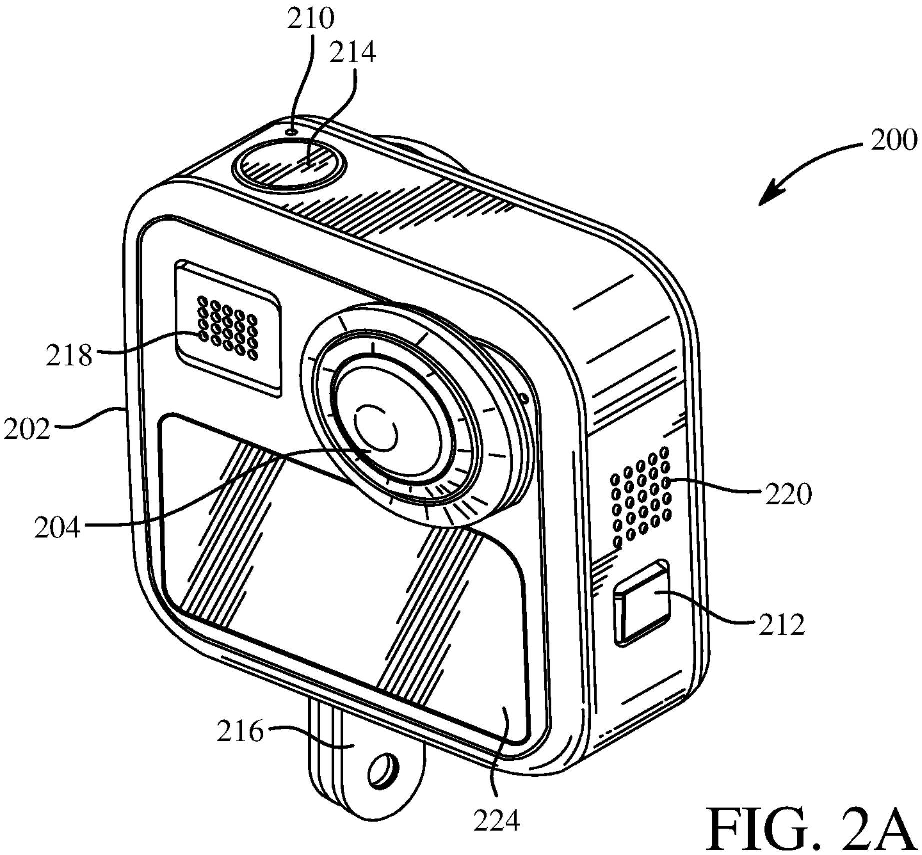
FIGS. 2A-2B are isometric views of another example of an image capture device.
Figure 2B:
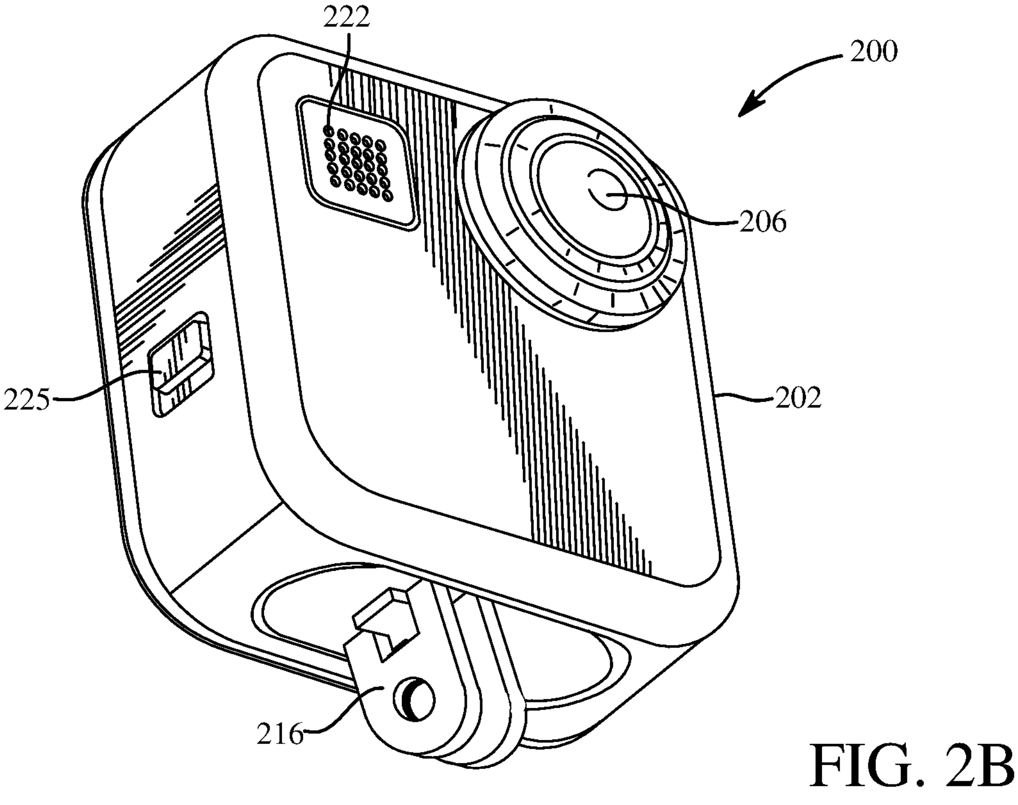

FIGS. 2A-2B illustrate another example of an image capture device 200. The image capture device 200 includes a body 202 and two camera lenses 204 and 206 disposed on opposing surfaces of the body 202, for example, in a back-to-back configuration, Janus configuration, or offset Janus configuration. The body 202 of the image capture device 200 may be made of a rigid material such as plastic, aluminum, steel, or fiberglass.

The image capture device 200 includes various indicators on the front of the surface of the body 202 (such as LEDs, displays, and the like), various input mechanisms (such as buttons, switches, and touch-screen mechanisms), and electronics (e.g., imaging electronics, power electronics, etc.) internal to the body 202 that are configured to support image capture via the two camera lenses 204 and 206 and/or perform other imaging functions.

The image capture device 200 includes various indicators, for example, LEDs 208, 210 to indicate a status of the image capture device 100. The image capture device 200 may include a mode button 212 and a shutter button 214 configured to allow a user of the image capture device 200 to interact with the image capture device 200, to turn the image capture device 200 on, and to otherwise configure the operating mode of the image capture device 200. It should be appreciated, however, that, in alternate embodiments, the image capture device 200 may include additional buttons or inputs to support and/or control additional functionality.

The image capture device 200 may include an interconnect mechanism 216 for connecting the image capture device 200 to a handle grip or other securing device. In the example shown in FIGS. 2A and 2B, the interconnect mechanism 216 includes folding protrusions configured to move between a nested or collapsed position (not shown) and an extended or open position as shown that facilitates coupling of the protrusions to mating protrusions of other devices such as handle grips, mounts, clips, or like devices.

The image capture device 200 may include audio components 218, 220, 222 such as microphones configured to receive and record audio signals (e.g., voice or other audio commands) in conjunction with recording video. The audio component 218, 220, 222 can also be configured to play back audio signals or provide notifications or alerts, for example, using speakers. Placement of the audio components 218, 220, 222 may be on one or more of several surfaces of the image capture device 200. In the example of FIGS. 2A and 2B, the image capture device 200 includes three audio components 218, 220, 222, with the audio component 218 on a front surface, the audio component 220 on a side surface, and the audio component 222 on a back surface of the image capture device 200. Other numbers and configurations for the audio components are also possible.

The image capture device 200 may include an interactive display 224 that allows for interaction with the image capture device 200 while simultaneously displaying information on a surface of the image capture device 200. The interactive display 224 may include an I/O interface, receive touch inputs, display image information during video capture, and/or provide status information to a user. The status information provided by the interactive display 224 may include battery power level, memory card capacity, time elapsed for a recorded video, etc.

The image capture device 200 may include a release mechanism 225 that receives a user input to in order to change a position of a door (not shown) of the image capture device 200. The release mechanism 225 may be used to open the door (not shown) in order to access a battery, a battery receptacle, an I/O interface, a memory card interface, etc. (not shown) that are similar to components described in respect to the image capture device 100 of FIGS. 1A and 1B.

In some embodiments, the image capture device 200 described herein includes features other than those described. For example, instead of the I/O interface and the interactive display 224, the image capture device 200 may include additional interfaces or different interface features. For example, the image capture device 200 may include additional buttons or different interface features, such as interchangeable lenses, cold shoes, and hot shoes that can add functional features to the image capture device 200.

Figure 3:
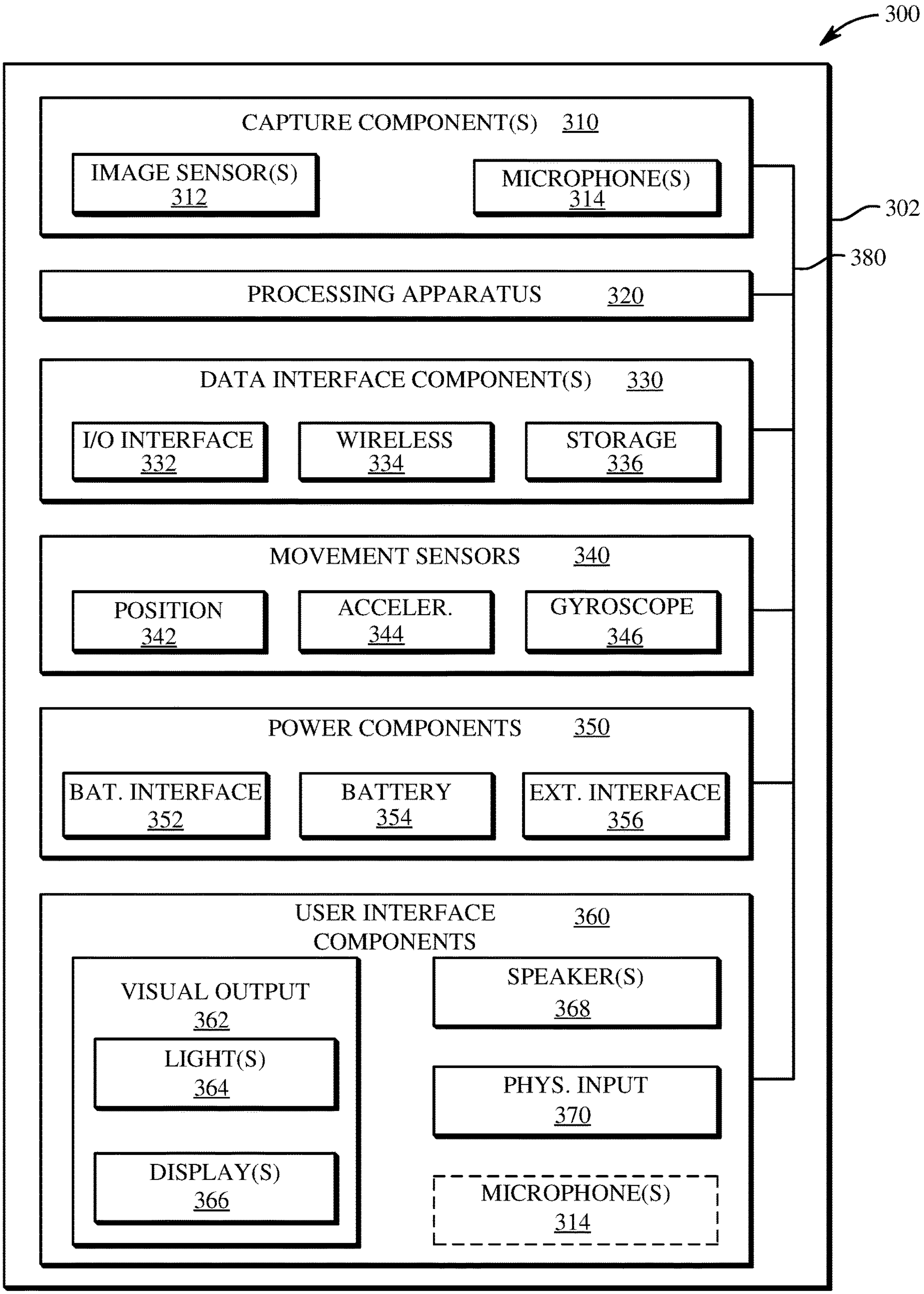
FIG. 3 is a block diagram of electronic components of an image capture device.

FIG. 3 is a block diagram of electronic components in an image capture device 300. The image capture device 300 may be a single-lens image capture device, a multi-lens image capture device, or variations thereof, including an image capture device with multiple capabilities such as use of interchangeable integrated sensor lens assemblies. The description of the image capture device 300 is also applicable to the image capture devices 100, 200 of FIGS. 1A-1B and 2A-2B.

The image capture device 300 includes a body 302 which includes electronic components such as capture components 310, a processing apparatus 320, data interface components 330, movement sensors 340, power components 350, and/or user interface components 360.

The capture components 310 include one or more image sensors 312 for capturing images and one or more microphones 314 for capturing audio.

The image sensor(s) 312 is configured to detect light of a certain spectrum (e.g., the visible spectrum or the infrared spectrum) and convey information constituting an image as electrical signals (e.g., analog or digital signals). The image sensor(s) 312 detects light incident through a lens coupled or connected to the body 302. The image sensor(s) 312 may be any suitable type of image sensor, such as a charge-coupled device (CCD) sensor, active pixel sensor (APS), complementary metal-oxide-semiconductor (CMOS) sensor, N-type metal-oxide-semiconductor (NMOS) sensor, and/or any other image sensor or combination of image sensors. Image signals from the image sensor(s) 312 may be passed to other electronic components of the image capture device 300 via a bus 380, such as to the processing apparatus 320. In some implementations, the image sensor(s) 312 includes a digital-to-analog converter. A multi-lens variation of the image capture device 300 can include multiple image sensors 312.

The microphone(s) 314 is configured to detect sound, which may be recorded in conjunction with capturing images to form a video. The microphone(s) 314 may also detect sound in order to receive audible commands to control the image capture device 300.

The processing apparatus 320 may be configured to perform image signal processing (e.g., filtering, tone mapping, stitching, and/or encoding) to generate output images based on image data from the image sensor(s) 312. The processing apparatus 320 may include one or more processors having single or multiple processing cores. In some implementations, the processing apparatus 320 may include an application specific integrated circuit (ASIC). For example, the processing apparatus 320 may include a custom image signal processor. The processing apparatus 320 may exchange data (e.g., image data) with other components of the image capture device 300, such as the image sensor(s) 312, via the bus 380.

The processing apparatus 320 may include memory, such as a random-access memory (RAM) device, flash memory, or another suitable type of storage device, such as a non-transitory computer-readable memory. The memory of the processing apparatus 320 may include executable instructions and data that can be accessed by one or more processors of the processing apparatus 320. For example, the processing apparatus 320 may include one or more dynamic random-access memory (DRAM) modules, such as double data rate synchronous dynamic random-access memory (DDR SDRAM). In some implementations, the processing apparatus 320 may include a digital signal processor (DSP). More than one processing apparatus may also be present or associated with the image capture device 300.

The data interface components 330 enable communication between the image capture device 300 and other electronic devices, such as a remote control, a smartphone, a tablet computer, a laptop computer, a desktop computer, or a storage device. For example, the data interface components 330 may be used to receive commands to operate the image capture device 300, transfer image data to other electronic devices, and/or transfer other signals or information to and from the image capture device 300. The data interface components 330 may be configured for wired and/or wireless communication. For example, the data interface components 330 may include an I/O interface 332 that provides wired communication for the image capture device, which may be a USB interface (e.g., USB type-C), a high-definition multimedia interface (HDMI), or a FireWire interface. The data interface components 330 may include a wireless data interface 334 that provides wireless communication for the image capture device 300, such as a Bluetooth interface, a ZigBee interface, and/or a Wi-Fi interface. The data interface components 330 may include a storage interface 336, such as a memory card slot configured to receive and operatively couple to a storage device (e.g., a memory card) for data transfer with the image capture device 300 (e.g., for storing captured images and/or recorded audio and video).

The movement sensors 340 may detect the position and movement of the image capture device 300. The movement sensors 340 may include a position sensor 342, an accelerometer 344, or a gyroscope 346. The position sensor 342, such as a global positioning system (GPS) sensor, is used to determine a position of the image capture device 300. The accelerometer 344, such as a three-axis accelerometer, measures linear motion (e.g., linear acceleration) of the image capture device 300. The gyroscope 346, such as a three-axis gyroscope, measures rotational motion (e.g., rate of rotation) of the image capture device 300. Other types of movement sensors 340 may also be present or associated with the image capture device 300.

The power components 350 may receive, store, and/or provide power for operating the image capture device 300. The power components 350 may include a battery interface 352 and a battery 354. The battery interface 352 operatively couples to the battery 354, for example, with conductive contacts to transfer power from the battery 354 to the other electronic components of the image capture device 300. The power components 350 may also include an external interface 356, and the power components 350 may, via the external interface 356, receive power from an external source, such as a wall plug or external battery, for operating the image capture device 300 and/or charging the battery 354 of the image capture device 300. In some implementations, the external interface 356 may be the I/O interface 332. In such an implementation, the I/O interface 332 may enable the power components 350 to receive power from an external source over a wired data interface component (e.g., a USB type-C cable).

The user interface components 360 may allow the user to interact with the image capture device 300, for example, providing outputs to the user and receiving inputs from the user. The user interface components 360 may include visual output components 362 to visually communicate information and/or present captured images to the user. The visual output components 362 may include one or more lights 364 and/or more displays 366. The display(s) 366 may be configured as a touch screen that receives inputs from the user. The user interface components 360 may also include one or more speakers 368. The speaker(s) 368 can function as an audio output component that audibly communicates information and/or presents recorded audio to the user. The user interface components 360 may also include one or more physical input interfaces 370 that are physically manipulated by the user to provide input to the image capture device 300. The physical input interfaces 370 may, for example, be configured as buttons, toggles, or switches. The user interface components 360 may also be considered to include the microphone(s) 314, as indicated in dotted line, and the microphone(s) 314 may function to receive audio inputs from the user, such as voice commands.

Figure 4A:
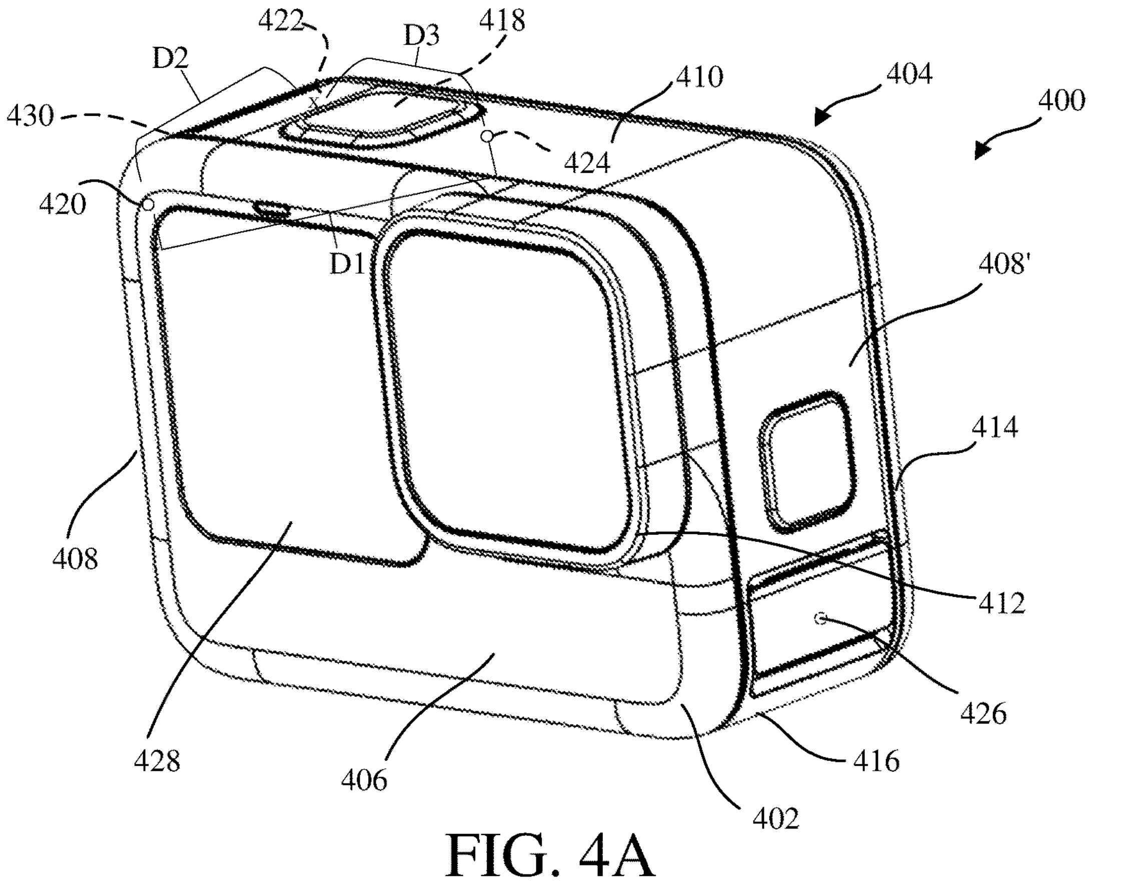
FIG. 4A illustrates an isometric view of an image capture device illustrating microphone positions.

FIG. 4A illustrates an image capture device 400. The image capture device 400 includes a body 402 including a housing 404. The housing 404 may form an open space therein. The housing 404 is a shell that contains internal components of the image capture device 400 such as a processor and integrated sensor and lens assembly (ISLA) (not shown) located behind a lens 412. A portion of the ISLA extends through the housing 404. The housing 404 may be made of or include plastic, metal, rubber, iron, steel, stainless steel, or a combination thereof. The housing 404 may be a geometric shape (e.g., square, rectangle). The housing 404 may include multiple walls.

The walls of the housing 404 include at least a forward wall 406, a side wall 408, and a top wall 410. The forward wall 406 may be a forward-facing wall of the housing 404. The forward wall 406 may face a direction where images are captured. A lens 412 extends through the forward wall 406, the lens 412 may protrude from the forward wall 406, or both. The forward wall 406 may connect to the side wall 408.

The side wall 408 may extend between the forward wall 406 and a rear wall 414. The side wall 408 may connect the top wall 410 to a bottom wall 416. The top wall 410 may include a shutter button 418. The shutter button 418, when pressed, causes the image capture device 400 to capture images with the image sensor (not shown) and audio with microphones. The microphones of the image capture device 400 include a forward microphone 420, a rear microphone 422 (denoted as an "x" to show that the microphone is on the rear wall), a top center microphone 424, and a side microphone 426. The rear microphone 422 is in a mirror image location on the rear wall as the forward microphone 420 in on the forward wall.

The forward microphone 420 functions to receive sound from a direction forward of the image capture device 400. The forward microphone 420 may be located at almost any location on the forward wall 406. The forward microphone 420 may be located in, under, extend through, or a combination thereof a top region of the forward wall 406 (e.g., a region closer to the top wall 410 than the bottom wall 416). The forward microphone 420 may be located on a side region (e.g., closer to the first side wall 408 than a second side wall 408') of the forward wall 406. The forward microphone 420 may be located in a corner of the forward wall 406. The forward microphone 420 (e.g., first microphone) may be located next to (e.g., adjacent) the lens 412, an LCD display 428, or both. The forward microphone 420 may be located at or near a corner of the LCD display 428, the forward wall 406, or both. The forward microphone 420 may be located adjacent to the rear microphone 422, the top center microphone 424, or both.

The rear microphone 422 may be located on the rear wall 414. The rear microphone 422 may be located on or within the side wall 408 that extends along the lens 412. The rear microphone 422 may be located in a corner of the rear wall 414 or mirror location of the forward microphone 420 (e.g., the rear microphone 422 and the front microphone 420 are spaced a distance apart that is equal to a thickness of the image capture device 400).

The top center microphone 424 may be located on or within the top wall 410. The rear microphone 422 and the top center microphone 424 may be located such that the forward microphone 420 is located 180 degrees from the rear microphone 422 and 90 degrees the top center microphone 424. For example, the rear microphone 422 and the top center microphone 424 may be located on the top wall 410, which is positioned 90 degrees from the forward wall 406 and the forward microphone 420. The rear microphone 422 may be located in a side region of the top wall 410 (e.g., closer to the second side wall 408' than the first side wall 408). The rear microphone 422 and the forward microphone 420 may be located a same or a similar distance from the second side wall 408'. The forward microphone 420 may be located between the rear microphone 422 and the top center microphone 424.

The rear microphone 422 and the top center microphone 424 may be located on or within a same plane. The rear microphone 422 and the top center microphone 424 may be spaced apart from one another. The rear microphone 422 and the top center microphone 424 may be located a same or substantially same distance from the forward wall 406 and the rear wall 414. The top center microphone 424 may be located substantially in a center of the top wall 410. The top center microphone 424 may be located on or within the top wall 410 in the center of the top wall 410, on a side of center toward the first side wall 408 of the top wall 410, or on a side of center toward the second side wall 408' of the top wall 410. The top center microphone 424 may be located in a different line or plane than the rear microphone 422 and the forward microphone 420 relative to edges of the top wall 410 and the forward wall 406. Thus, for example, the top center microphone 424 and the rear microphone 422 may be located different distances from a forward edge 430 of the top wall 410. As shown, the forward microphone 420 is located a distance D1 from the top center microphone 424. The distance D1 may be about 10 mm or more, about 15 mm or more, about 20 mm or more, or about 25 mm or more (e.g., about 27.75 mm). The distance D1 may be about 100 mm or less, about 50 mm or less, about 40 mm or less, or about 30 mm or less.

The forward microphone 420 may be located a distance D2 from the rear microphone 422. The distance D2 may be substantially equal to the distance D1. The distance D1 may be less than the distance D2. The distance D1 may be greater than the distance D2. The distance D2 may be about 10 mm or more, about 15 mm or more, about 20 mm or more, or about 25 mm or more. The distance D2 may be about 100 mm or less, about 50 mm or less, about 40 mm or less, or about 30 mm or less.

The rear microphone 422 may be located a distance D3 from the top center microphone 424. The distance D3 may be substantially equal to the distances D1 and D2. The distance D3 may be less than the distance D1, the distance D2, or both. The distance D3 may be greater than the distance D1, the distance D2, or both. The distance D3 may be about 10 mm or more, about 15 mm or more, about 20 mm or more, or about 25 mm or more. The distance D3 may be about 100 mm or less, about 50 mm or less, about 40 mm or less, or about 30 mm or less.

The distances D1, D2, D3 between various combinations of the forward microphone 420, the rear microphone 422, and the top center microphone 424 assist a processor in selecting the microphone with the least wind noise, perform beamforming, perform direction of arrival estimation, or a combination thereof. The microphones may be located at distances relative to the respective edges of the walls and on different planes so that the processor may more easily identify which microphone a given sound reaches first. For example, if a specific sound is first detected by the top center microphone 424, then the rear microphone 422, the processor can determine a direction from which the given sound was made. To support this, the microphones may be located in a triangle. The triangle may be an equilateral triangle, an isosceles triangle, a scalene triangle, an acute triangle, a right triangle, an obtuse triangle, or a combination thereof. The microphones may be located at the vertices of the triangle.

The forward microphone 420 may be located a distance D1 from the forward edge 430. The top center microphone 424 may be located a distance D2 from the forward edge 430. The rear microphone 422 may be located a distance D3 from the rear wall 414. The distance D1 and the distance D2 may be substantially equal. The distance D3 may be less than the distance D1, the distance D2, or both. The distance D3 may be substantially equal to the distance D1, the distance D2, or both. The distance D3 may be greater than the distance D2, the distance D1, or both. The housing 404 may include the side microphone 426. The microphones 420, 422, 424 may be located on surfaces of the housing 404. A location of the microphones 420, 422, 424 relative to sides and/or edges of the housing 404 may change how and when sound reaches each of the microphones 420, 422, 424. For example, wind may interfere with one of the microphones (e.g., a forward microphone 420) and the sound may be captured by other microphones (e.g., a rear microphone 422 and/or top center microphone 424). The microphones 420, 422, 424 may be adjusted along the housing depending an application of the image capture device 400. For example, if the image capture device 400 is used for skiing the microphones may be at different distances than if the image capture device 400 is used for diving.

The side microphone 426 may be located on or within the side wall 408. The side microphone 426 may be a drainage microphone. The side microphone 426 may be located on a third wall (e.g., the side wall 408), diagonally opposite the forward microphone 420, within or on a third plane, or a combination thereof. The side microphone 426 may assist in removing wind noise, performing beamforming, performing direction of arrival estimation, or a combination thereof. The side microphone 426 may be located internally within the housing 404 so that the side microphone 426 is protected from fluids, debris, dust, or a combination thereof.

Figure 4B:
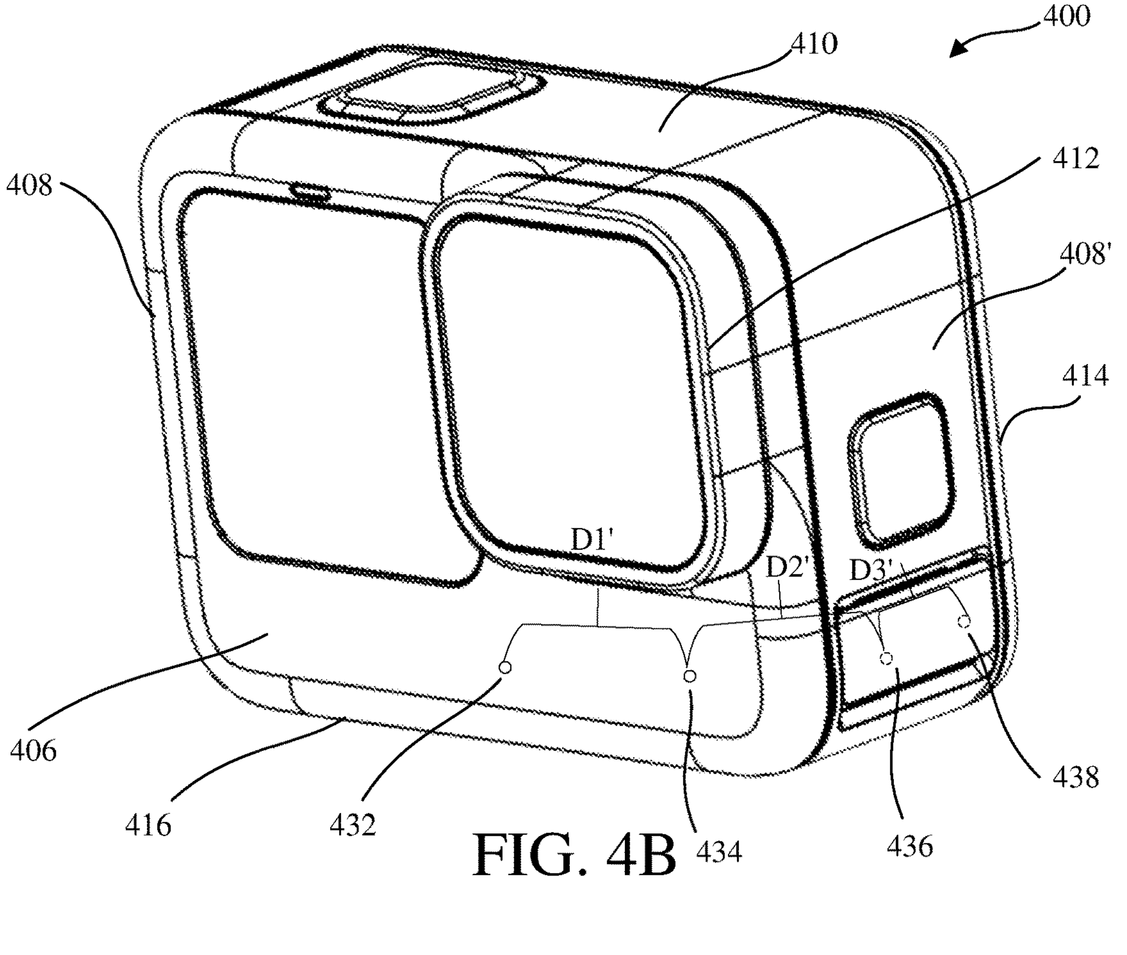
FIG. 4B illustrates an isometric view of an image capture device illustrating microphone positions.

FIG. 4B illustrates the image capture device 400 having the forward wall 406, the side walls 408, 408', and the top wall 410. The top wall 410 is free of microphones, and the forward wall 406 now includes two microphones as compared to the image capture device 400 as shown in FIG. 4A. The microphones on the forward wall 406 in FIG. 4B include a first microphone that is a forward center microphone 432 and a second microphone that is a forward side microphone 434.

The forward center microphone 432 is located closer to a center of the image capture device 400 than the forward side microphone 432. The forward center microphone 432 may be located substantially equal distance between the side wall 408 and the side wall 408' (e.g., a distance equal to a thickness of the image capture device). The forward center microphone 432 may be located in a center region of the forward wall 406. The forward center microphone 432 may be located under the lens 412. The forward center microphone 432 may be located on the forward wall 406 to capture audio from a direction the image capture device 400 faces. The forward side microphone 434 is located between the forward center microphone 432 and the side wall 408.

The forward side microphone 434 may be located in a side region proximate to the side wall 408 or the side wall 408'. The forward side microphone 434 may be located under the lens 412. The forward side microphone 434 may be located in a same line as the forward center microphone 432 (e.g., a same distance from the top wall 410, the bottom wall 416, or both). The forward side microphone 434 and the forward center microphone 432 may be located in a different line (e.g., staggered relative to the top wall 410, the bottom wall 416, or both). The forward center microphone 432 and the forward side microphone 434 may be located adjacent to a side front microphone 436 and a side rear microphone 438.

The side front microphone 436 and the side rear microphone 438 are located on the side wall 408. The side front microphone 436 may be located closer to the forward wall 406 than the side rear microphone 438. The side rear microphone 438 may be located closer to the rear wall 414 than the side front microphone 436. The side front microphone 436, the side rear microphone 438, or both may be drainage microphones. The side front microphone 436 and the side rear microphone 438 may be located equal distances from the bottom wall 416. The side front microphone 436 and the side rear microphone 438 may be located different distances from the bottom wall 416. The side front microphone 436 is shown as located closer to the forward wall 406 than the side rear microphone 438. The side rear microphone 438 is located closer to the rear wall 414 than the side front microphone 436. The forward center microphone 432, the forward side microphone 434, the side front microphone 436, and the side rear microphone 438 may all be located substantially in a straight line extending through the image capture device 400 as shown.

The forward center microphone 432 is located a distance D1' from the forward side microphone 434. The forward side microphone 434 is located a distance D2' from the side front microphone 436. The side front microphone 436 is located a distance D3' from the side rear microphone 438. The distance D1', the distance D2', and the distance D3' may be substantially equal. The distance D1' may be greater than the distance D2', the distance D3', or both. The distance D1' may be less than the distance D2', the distance D3', or both. The distance D2' may be greater than the distance D1', the distance D3', or both. The distance D1', the distance D2', the distance D3', or a combination thereof may be about 3 mm or more, about 5 mm or more, about 7 mm or more, or about 10 mm or more. The distance D1', the distance D2', the distance D3', or a combination thereof may be about 50 mm or less, about 40 mm or less, about 30 mm or less, about 20 mm or less, or about 15 mm or less.

The forward center microphone 432, the forward side microphone 434, the side front microphone 436, and the side rear microphone 438 are all positioned within a spacious area of the image capture device 400 where user interference is avoided. The forward center microphone 432 and the forward side microphone 434 are located on separate walls from the side front microphone 436 and the side rear microphone 438 thus limiting wind noise to some of the microphones 432, 434, 436, 438. For example, the forward center microphone 432 and the forward side microphone 434 may experience wind noise while the side front microphone 436 and the side rear microphone 438 are protected from the wind noise.

Figure 4C:
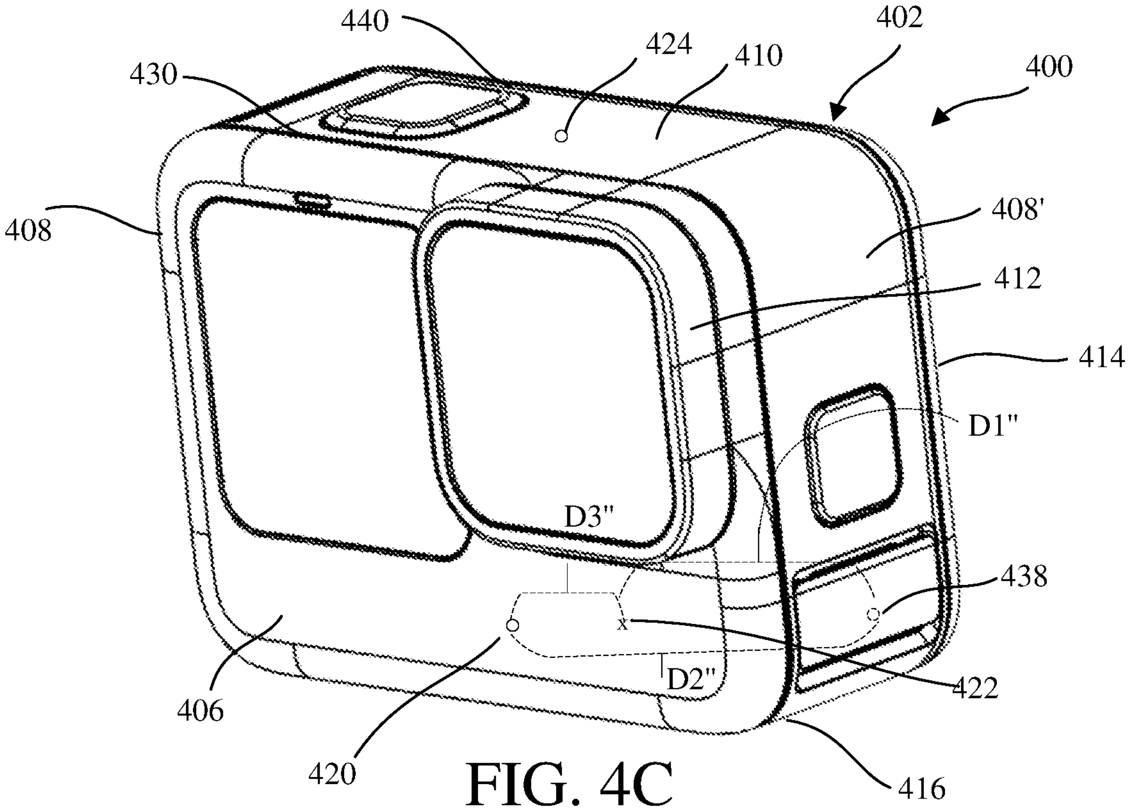
FIG. 4C illustrates an isometric view of an image capture device illustrating microphone positions.

FIG. 4C illustrates an isometric view of the image capture device 400 with high microphone diversity (e.g., microphones 420, 422, 424, 438 located on three or more surfaces). A high microphone diversity assists in reducing wind noise when considered relative to an image capture device 400 with a lower microphone diversity (e.g., two or less). The forward wall 406 includes the forward microphone 420. The forward microphone 420 is located in a center region of the forward wall 406. The forward microphone 420 may be located under the lens 412. The forward microphone 420 may be located substantially equal distance from the side wall 408 and the side wall 108'. The forward microphone 420 may be located in a region below the top center microphone 424.

The top center microphone 424 may be located in a center region of the top wall 410. The top center microphone 424 may be located substantially equal distance from the side wall 408 and the side wall 408'. The top center microphone 424 may be located substantially equal distance from the forward edge 430 and the rear edge 440. The top center microphone 424 may be located on a different plane than the forward microphone 420 so that if wind were to disrupt sound capture with the forward microphone 420, the top center microphone 434 may be used to capture the sound. The top center microphone 424 may be located in a different plane than a rear microphone 422 (denoted as an "x" to show that the microphone is on the rear wall 414).

The rear microphone 422 may be located on the rear wall 414. The rear microphone 422 may be located on or within the side wall 408 that extends along the lens 412. The rear microphone 422 may be located in a corner of the rear wall 414 or mirror location of the forward microphone 420.

The forward microphone 420, the rear microphone 422, and the side rear microphone 438 may be the primary microphones used to gather sound. The forward microphone 420, the rear microphone 422, and the side rear microphone 438 may provide sound signals to the processor so that the processor may select a microphone to record, reduce wind noise, perform flexible beamforming, perform direction of arrival estimation. The primary microphones (e.g., forward microphone 420, rear microphone 422, and the side rear microphone 438) may be located on one or more planes, two or more planes, or three or more planes. The primary microphones may work in conjunction with one or more secondary microphones such as the top center microphone 424. A primary microphone may be one or more microphones that a processor uses first to capture sound. A secondary microphone may be one or more microphones that are used when sound captured by the primary microphones are of low quality.

The side rear microphones 438 may be located on or within the side wall 408. The side rear microphone 438 may be located on the side wall 408 on the body 402. The side rear microphone 438 may be a drainage microphone. The side rear microphone 438 may be located closer to the bottom wall 416 than the rear microphone 422. The side rear microphone 438 may be the microphone located closest to the bottom wall 416. The forward microphone 420, the top center microphone 424, the rear side microphone 436, or a combination thereof may all be substantially equally spaced apart.

The side rear microphone 438 and the rear microphone 422 may be located a distance D1" apart. The side rear microphone 438 and the forward microphone 420 may be located a distance D2" apart. The forward microphone 420 and the rear microphone 422 may be located a distance D3" apart. The distance D1", the distance D3", the distance D2", or a combination thereof may be substantially equal. Distance D1" and distance D3" may be greater than distance D2". Distance D1" may be greater than distance D3" and distance D2". Distance D1''' may be the largest distance. Distance D2''' may be the largest distance. Distance D3''' may be the largest distance. Distance D1''' may be shorter than distance D2''', distance D3''', or both. Distance D3" may be a shortest distance. Distance D3" may extend through the housing 404 (e.g., between the forward wall 406 and the rear wall 414). Distances D1''', D2''', D3''', or a combination thereof may be about 5 mm or more, about 7 mm or more, or about 10 mm or more. Distances D1''', D2''', D3''', or a combination thereof may be about 50 mm or less, about 40 mm or less, about 30 mm or less, or about 20 mm or less. Distances between microphones may increase microphone diversity.

Microphone diversity may be a combination of distances and locations on or within a housing. Thus, microphones located close together and on multiple walls may have a higher microphone diversity than microphones located on a same wall but spaced apart. Conversely, microphones located far apart may have a higher microphone diversity than microphones located on two walls by located close together as wind may still impact the tightly located microphones more than the microphones spaced apart. Microphone diversity may assist in removing wind noise, beamforming, direction of arrival estimation, or a combination thereof.

Figure 4D:
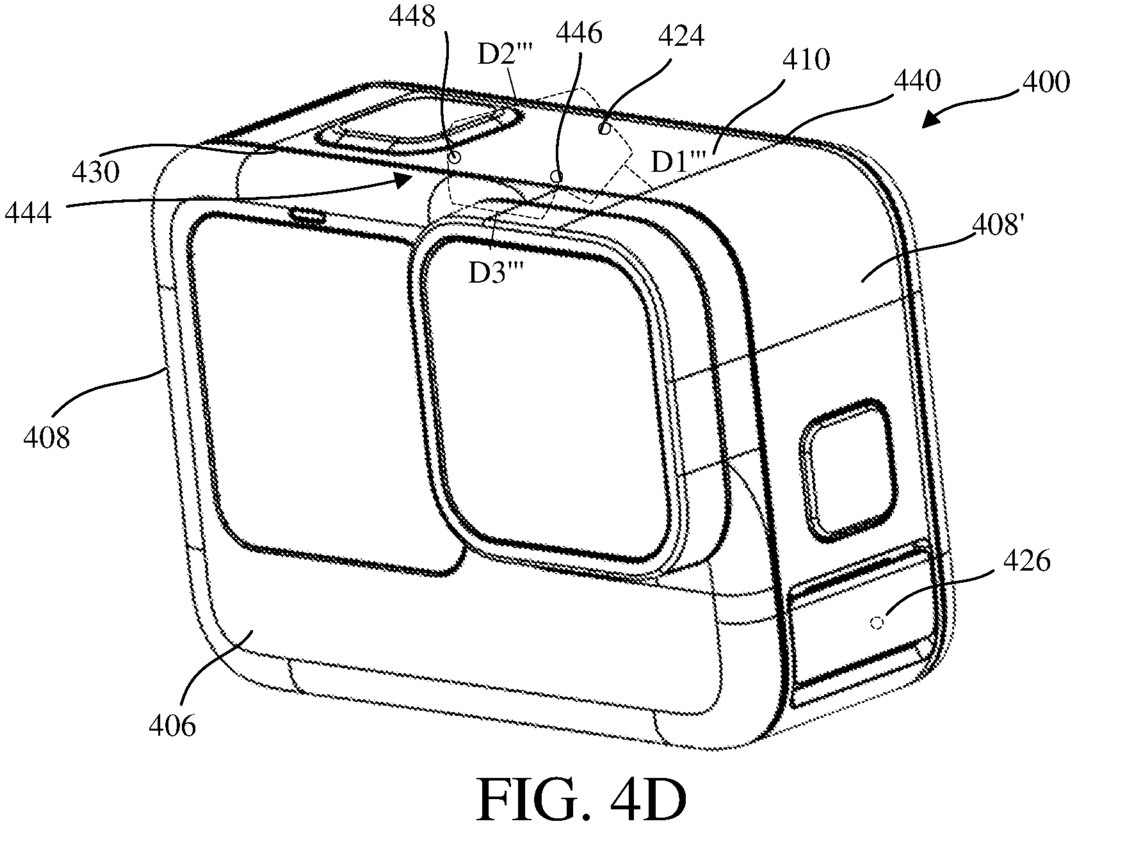
FIG. 4D illustrates an isometric view of an image capture device illustrating microphone positions.

FIG. 4D illustrates an isometric view of the image capture device 400. The image capture device 400 includes the forward wall 406, the side wall 408, and the top wall 410. The forward wall 406, as shown, is free of microphones. The side wall 408 includes the side microphone 426.

The side microphone 426 is a secondary microphone and may be used to select a microphone, reduce noise, perform beamforming, performing direction of arrival estimation, assist the primary microphones (e.g., a top center microphone 424, a top side microphone 446, and a top second side microphone 448), or a combination thereof. The side microphone 426 may be located on or within the side wall 408. The side microphone 426 may be a drainage microphone. The side microphone 426 may be located on or within a first plane. The first plane may be substantially perpendicular to a second plane that comprises the top wall 410.

The top wall 410 may include top microphones 444. The top microphones 444 may include the top second side microphone 448, the top center microphone 424, and the top side microphone 446. The top microphones 444 may be connected to a processor (not shown) so that the top microphones 444 and the processor are configured to select a microphone, reduce wind noise, perform beamforming, perform direction of arrival estimation, or a combination thereof. The top microphones 444 may be located in a geometric shape such as a triangle. The top microphones 444 may be located in a configuration so that the top microphones 444 are capable of estimating a direction of the sound. The top center microphone 424 may be located on the top wall 410 between the top second side microphone 448 and the top second side microphone 446.

The top second side microphone 448 may be located closest to the side wall 408'. The top side microphone 446 may be located closest to the side wall 408. The top second side microphone 448 and the top side microphone 446 may be located proximate to the forward edge 430 of the top wall 410. The top center microphone 424 may be located proximate to the rear edge 440 of the top wall 410. The top center microphone 424 may be spaced apart from the top second side microphone 448 and the top side microphone 446.

The top microphones 444 may be located in a center region of the top wall 410. The top microphones 444 may be skewed towards the forward wall 406 so that desired sounds, to be recorded, are generally located in a direction forward of the image capture device 400. The top microphones 444 may work in tandem with the processor to record high quality sound (e.g., sound that is free of wind noise, disturbances, or both and is clearly audible). The top second side microphone 448, the top center microphone 424, and the top side microphone 446 may all be located substantially in a same plane, equal distance apart, in a triangle, or a combination thereof.

The top center microphone 424 and the top side microphone 446 may be located a distance D1''' apart. The top center microphone 424 and the top second side microphone 448 may be located a distance D2''' apart. The top second side microphone 448 and the top side microphone 446 may be located a distance D3''' apart. The distance D1''', the distance D2''', the distance D''', or a combination thereof may all be substantially a same length.

Figure 5:
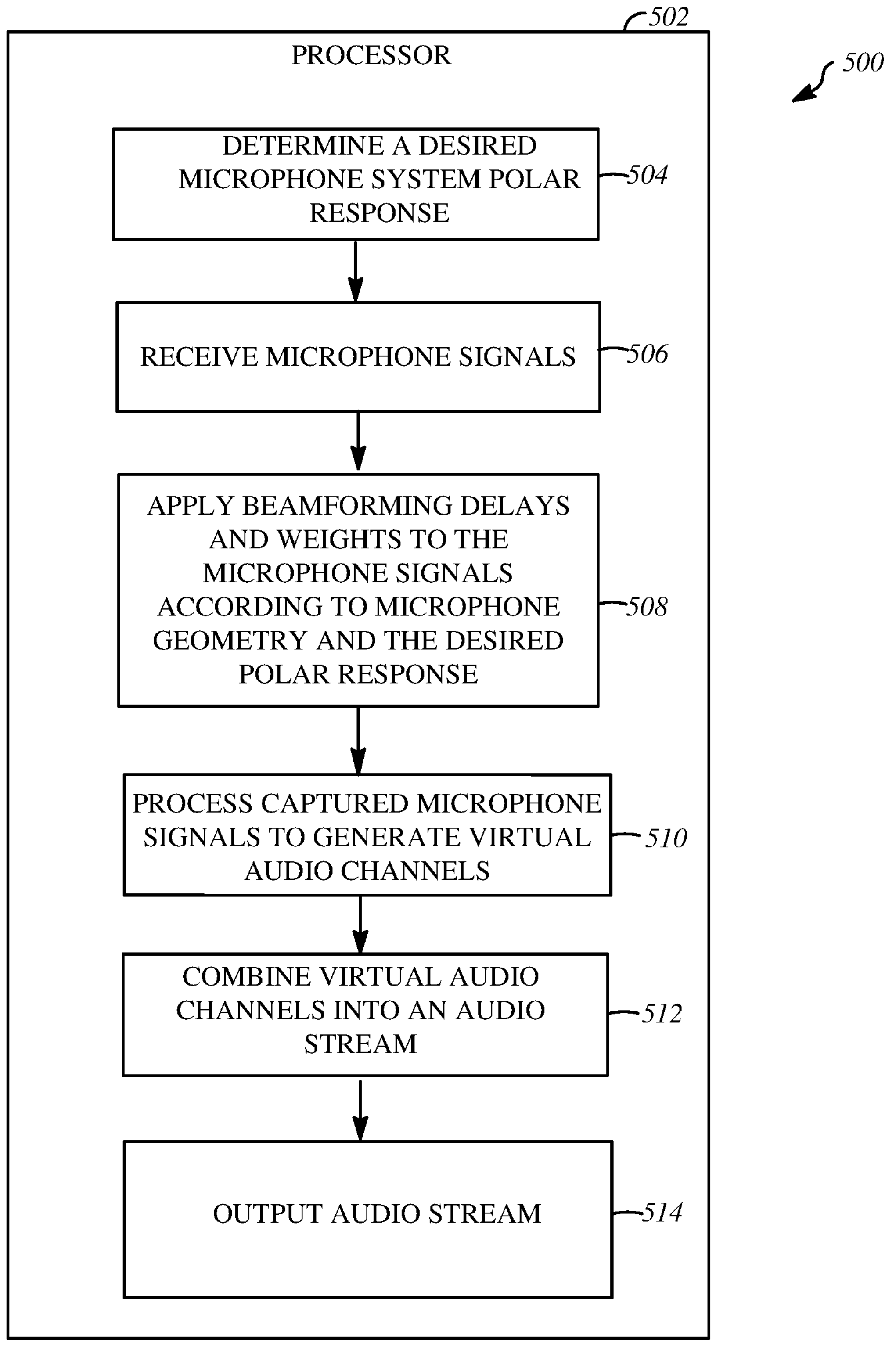
FIG. 5 illustrates a flow diagram illustrating flexible beamforming.

FIG. 5 illustrates a block diagram 500 illustrating a processor 502 and steps 504, 506, 508, 510, 514, 514 of performing flexible beamforming. The processor 502 can execute step 504 of determining a desired microphone system polar response. The polar response indicates a direction of sound. For example, sound arrives at microphones at different angles and times and the processor 502 plots the angles at which sound is being captured as the polar response. The polar response may include a plot of frequencies of the sound being captured (e.g., may form one or more cardioids, subcardioids, hypercardioids, or supercardioids). The polar response may consider direction of sound, angle of sound, or both. The polar response may be frequency dependent. The polar response may consider attenuation or reduction in sound being captured. The step 504 may include the polar response that consider no sound or null sound. The step 504 regarding the polar response may consider lobes of sound being captured when sound is plotted. Once the polar response is determined, the microphone signals are received at step 506.

In step 506, the microphone signals received may be from a first channel (e.g., a left channel), a second channel (e.g., a right channel), or both. The signal to noise ratio (SNR) of the channels may be determined. The frequency, a cardioid, or both, of the channels may be determined, created, or analyzed. The first channel may be received at 0 degrees, 60 degrees, or 120 degrees. The second channel may be received at 0 degrees, 60 degrees, or 120 degrees. After the microphone signals are received in the step 506, the processor 502 may apply beamforming to the microphone signals in step 508.

In step 508, the processor may apply beamforming delays, apply weights to the microphone signals, or both according to microphone array geometry and the desired polar response (from step 504). The beamforming delays may be influenced by positions of microphones on the image capture device. The beamforming delays may be influenced by wind. The beamforming delays may allow the processor 502 to reconfigure sound in a time reliant manner so that sound may be reconstructed and played, providing sound playback substantially as made in real time. The beamforming delays may configure sound into stereo sound. The beamforming delays and weights may be performed for each channel in step 508, then captured microphone signals may be processed in step 510.

The captured microphone signals may be processed in step 510 to generate a virtual audio channel. The virtual audio channels may be formed to create the polar response of the user's choosing. The virtual audio channels are then combined into an audio stream in step 512. The audio stream can be output in step 514.

Figure 6:
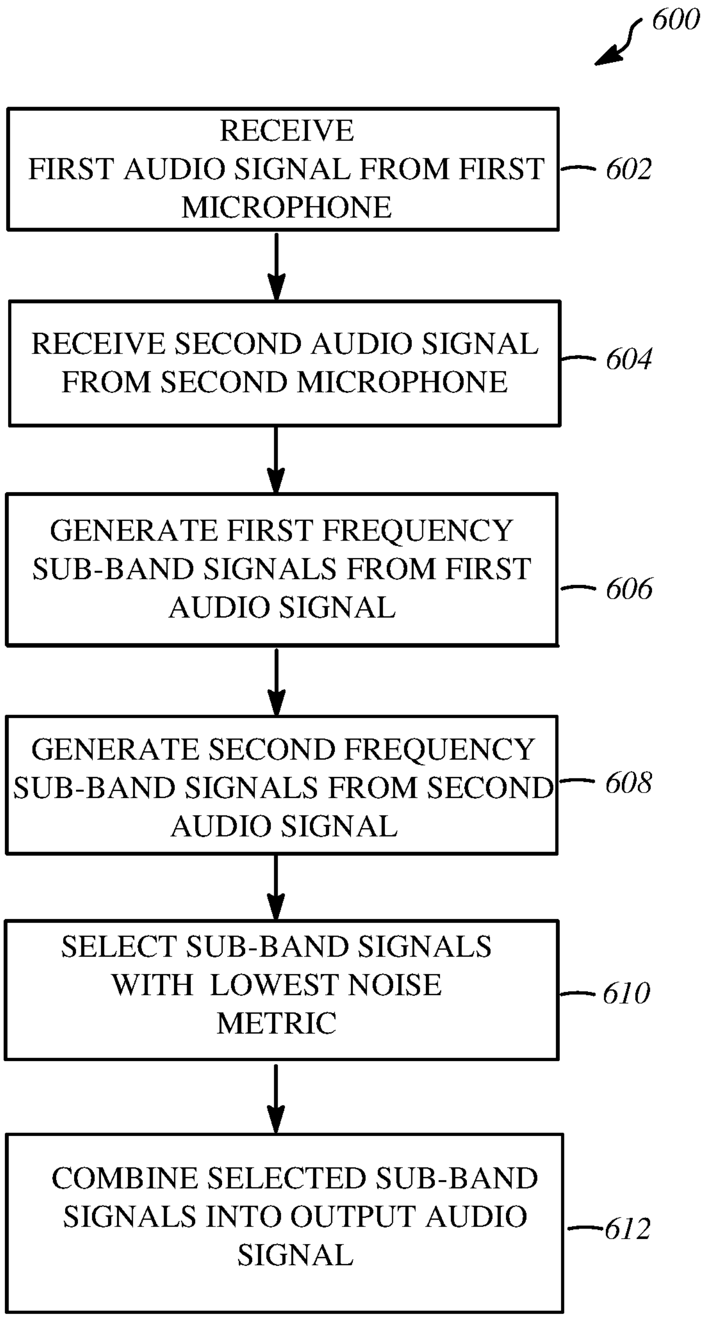
FIG. 6 illustrates a flow diagram illustrating wind noise reduction.

FIG. 6 illustrates a block diagram 600 (e.g., a method) to eliminate wind noise, optimize sound, or both. A processor receives a first audio signal from a first microphone at 602. The processor receives a second audio signal from a second microphone at 604. The processor may receive signals from a third microphone or even a fourth microphone. The processor may monitor audio signals from a multitude of microphones. The processor may receive audio signals from a minimum of two microphones. Once the audio signals are received by the processor, at step 604, the processor may analyze the audio signals.

A first frequency sub-band is generated from the first audio signal at 606. A second frequency sub-band is generated from the second audio signal at 608. The processor may generate a sub-band from each audio signal of a microphone. For example, if there are four microphones then four frequency sub-bands may be generated at step 608. Once the frequency sub-bands are generated then the sub-bands may be analyzed.

The processor reviews each of the sub-bands to determine a noise metric of the sub-bands. The processor then selects a sub-band with a lowest noise metric at step 610. The noise metric, at step 610, may be wind, background noise, inaudible noise, noise within a predetermined frequency, or a combination thereof. The noise metric, at step 610, may be based on a total decibel level. Once the sub-band with the lowest noise metric, at step 610, is selected then an audio signal may be generated. The audio signal, at step 610, may be generated by combining selected sub-bands into an audio signal, at 612. The selected sub-bands may be combined in a time dependent manner. For example, one sub-band may be selected from a period of 0 to 30 seconds and then a second sub-band may be selected for a period from 30 to 45 seconds. The first sub-band and the second sub-band may be combined together to form one, 45 second audio signal.

Figure 7A:
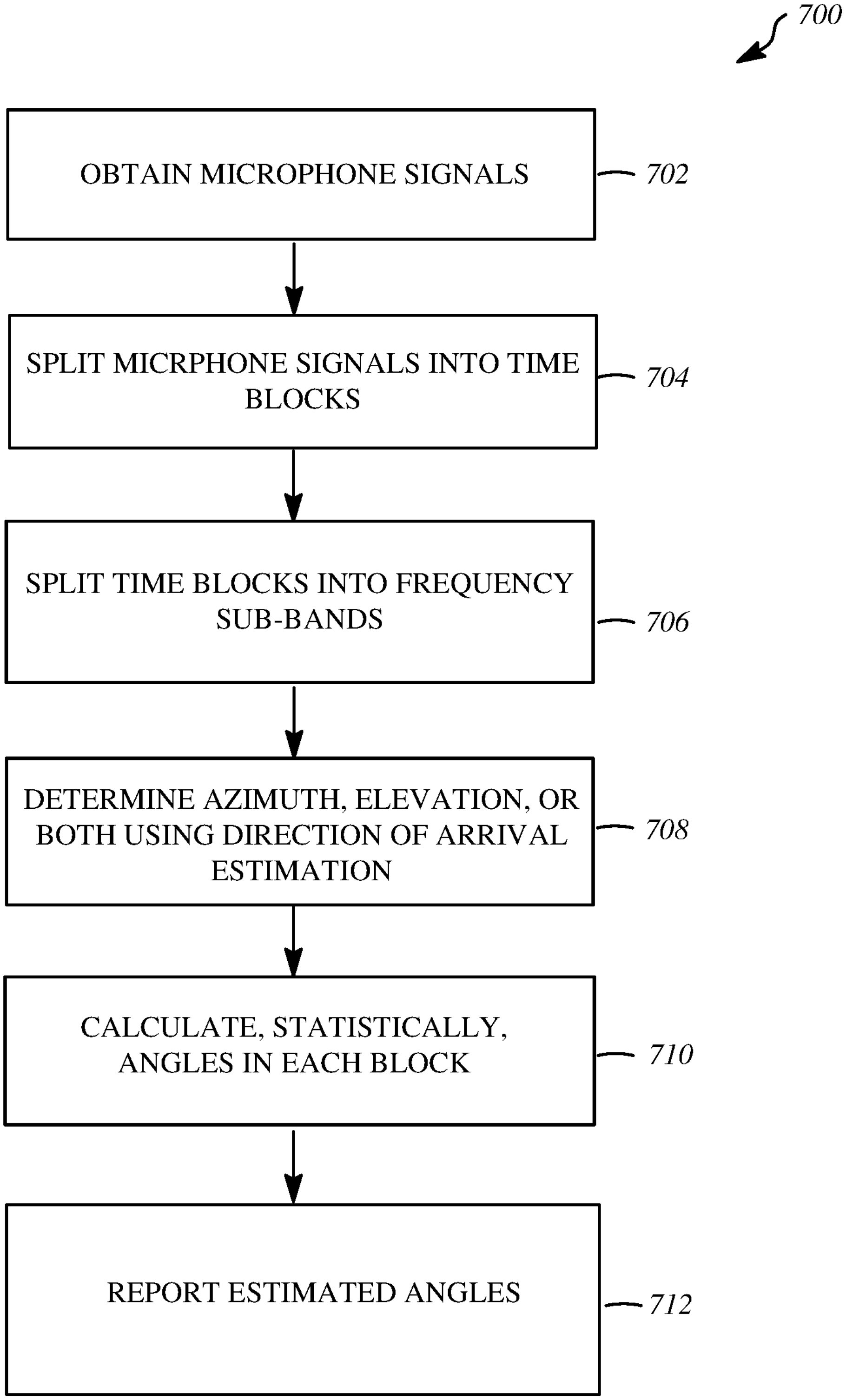
FIG. 7A illustrates a flow diagram illustrating a direction of arrival estimation.

FIG. 7A illustrates a block diagram 700 related to a direction of arrival estimation. The direction of arrival estimation begins by obtaining microphone signals at 702. The microphone signals may be generated by multiple microphones at 702. The microphone signals may be generated by two or more microphones, three or more microphones, or even four or more microphones.

The microphone signals are split into time blocks at step 704. Each of the microphone signals may generate a set of time blocks at 704. The time blocks may be a predetermined amount of time, a predetermined sound threshold, predetermined sound signals, or a combination thereof. The time blocks are then split into frequency sub-bands at 706.

The frequency sub-bands, at step 706, may be divided by changes in frequencies, peak frequencies, occurrences of frequency changes, or a combination thereof. The frequency sub-bands may be compared to frequency sub-bands of other time blocks from step 704. The frequency sub-bands may be analyzed.

A processor may analyze the frequency sub-bands and determine azimuth, elevation, or both using direction of arrival estimation at 708. The azimuth may be based upon a coordinate system. The azimuth may be located within a spherical coordinate system. The azimuth may be a direction of a point of interest within a reference plane or an angle of the point of interest relative to the reference plane. The elevation may be a distance from the reference plane. The elevation may be a distance relative to the microphones. The azimuth, elevation, or both may determine a direction sound was made relative to an image capture device such as the image capture devices 100, 200, 300, and/or 400.

The processor may calculate angles of sound captured in each block, sub-band, or both at 710. The processor may statistically calculate an angle of a given sound in each block, sub-band, or both at 710. The angles may be determined by analyzing a time block, a sub-band, or both from a single microphone, two or more microphones, three or more microphones, or four or more microphones. The angles may be calculated for each of the time blocks based on statistically significant microphone signals gathered at step 710.

Once the angles are estimated, the estimated angles are reported at 712. The angles reported may provide a direction that sound is being generated, a direction of a detected sound, or both. The angles reported may provide a direction of sounds within a predetermined frequency range.

Figure 7B:
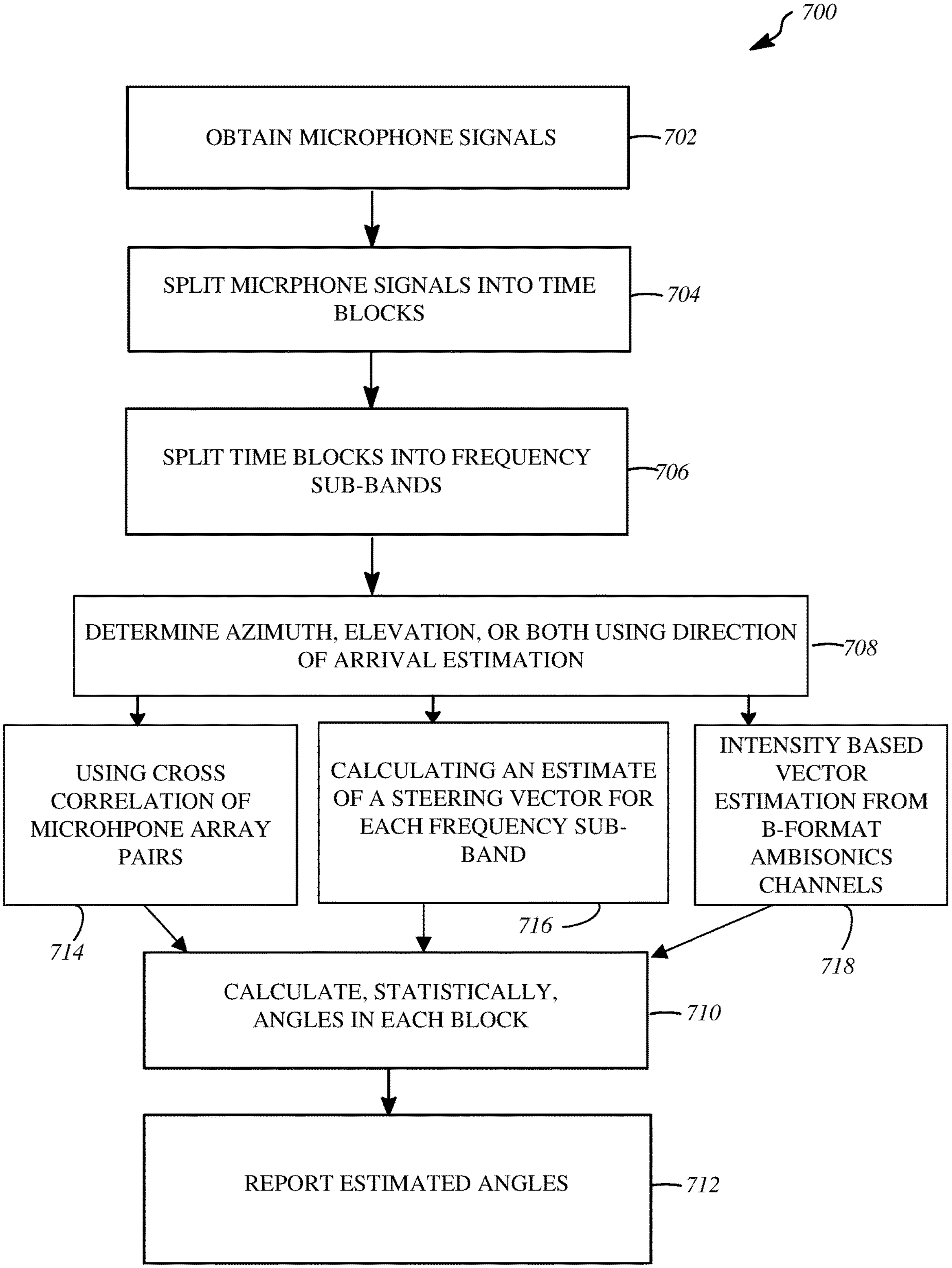
FIG. 7B illustrates a flow diagram illustrating alternative direction of arrival estimations.

FIG. 7B is a block diagram 700 of a direction of arrival estimation. The direction of arrival estimation of step 700 of FIG. 7B is substantially identical to that described with respect to FIG. 7A; however, additional or alternative steps may be performed. As shown, the determining, at step 708, may be where the azimuth, the elevation, or both are ascertained via direction of arrival estimation may be performed via one or more sub-steps.

The sub-steps at 714, 716, 718 may include the sub-step at 714 of cross correlating microphone array pairs. The correlation of the microphone array pairs, at 714, may determine when a given sound reaches a first microphone and then reaches a second microphone. The correlation, at 714, then leads to a comparison between the individual microphones in the first microphone array pair may provide a first azimuth, elevation, direction, angle, or a combination thereof. The comparison may be performed between individual microphones in a second microphone array pair. Step 714 may be performed for a second microphone array pair (e.g., the second microphone and a third microphone) may provide a second azimuth, elevation, direction, angle, or a combination thereof. The comparison, of step 714, may be performed between individual microphones in a third microphone array pair. The third microphone array pair (e.g., the first microphone and the third microphone) may provide a third azimuth, elevation, direction, angle, or a combination thereof. Use of the third microphone array pair may allow the processor to estimate sound based upon when the given sound arrives at each microphone. The correlation of the microphone pairs in sub-step 714 may be performed alone or in combination with calculating an estimate of a steering vector for each frequency sub-band in step 716.

The estimate of the steering vector for each of the frequency sub-bands in sub-step 716 may include calculating a phase delay between microphones, at a microphone, or both. The processor, at step 716, may determine the phase delay between microphones to ascertain a direction the given sound arrives based upon the time delay between two or more microphones or even three or more microphones receiving the given sound. For example, if a specific sound is analyzed by the processor to determine when in a time continuum the specific sound arrives at each microphone (e.g., of the first, second, and/or third microphones). Based on when the specific sound arrives at each microphone, the direction or angle of the sound may be triangulated and determined at step 716. The processor may use the microphone array pairs correlated at sub-step 714, the steering vector estimated at sub-step 716, intensity-based vector estimation from a b-format ambisonics channel at sub-step 718, or a combination thereof.

Step 718 may monitor channels of each microphone for height and depth to generate a resulting signal as a b-format. The b-format components may be combined together. The b-format components may be combined to form a first-order polar pattern (e.g., omnidirectional, cardioid, hypercardioid, figure-of-eight, or a combination thereof). The b-format components may be combined together to form a virtual microphone. Based upon the b-format, the first-order polar pattern, or both a vector may be formed. The vector of step 718 may be analyzed in step 710.

In step 710 the intensity of the vector from step 718 may be analyzed to calculate angles for the sound. The processor may determine a primary sound to be recorded (e.g., a voice), and then based upon the primary source of the primary sound, the processor may determine a location of the primary sound relative to the first microphone, the second microphone, the third microphone, the image capture device, or a combination thereof. The processor may analyze the primary sound (e.g., a most intense sound) only. The processor may determine a location of a loudest sound or a most intense sound being recorded. For example, if a recording is being made and there is a firework set off, the system would analyze the direction of the firework. Once one or more of the sub-steps 714, 716, or 718 are performed, angles may be calculated for each of the time blocks at step 710. These angles may be reported to a user, reported to a processor, used to store sound a specific sound, or a combination thereof at step 712.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An image capture device comprising:
- a housing comprising:
  - a forward wall;
  - an integrated sensor and lens assembly that is configured to capture a video, the integrated sensor and lens assembly extending through the forward wall of the housing,
  - a rear wall located opposite the forward wall, and
  - a top wall connecting the forward wall and the rear wall;
- three or more microphones configured to capture sound, wherein the three or more microphones comprise a first microphone, a second microphone, and a third microphone; and
- a processor configured to:
  - receive sound from the three or more microphones in conjunction with the video as the video is captured and to estimate a direction of arrival, reduce or remove wind noise, perform beamforming, or a combination thereof,
  - select one of a first microphone, a second microphone, or a third microphone of the three or more microphones with a lowest amount of the wind noise based upon the sound captured by the three or more microphones, and
  - divide the sound captured by the three or more microphones into individual frequency sub-bands so that the direction of arrival is estimated based on the sound captured by the three or more microphones,
- wherein the first microphone is located on or within the forward wall adjacent to the integrated sensor and lens assembly, the second microphone is located on or within the rear wall so that the second microphone is spaced apart from the first microphone, and the third microphone is spaced apart from the first microphone and the second microphone.

2. The image capture device of claim 1, wherein the first microphone, the second microphone, and the third microphone are located with respect to the housing to form vertices of a triangle.

3. The image capture device of claim 2, wherein the triangle is an equilateral triangle.

4. The image capture device of claim 1, wherein the first microphone and the second microphone are located directly opposite one another with respect to the housing so that the first microphone and the second microphone are spaced a distance apart that is equal to a thickness of the image capture device.

5. The image capture device of claim 4, wherein the first microphone is located in a corner of the forward wall and the second microphone is located in a corner of the rear wall.

6. The image capture device of claim 1, wherein the three or more microphones comprise a drainage microphone.

7. The image capture device of claim 1, wherein the forward wall includes a drainage channel.

8. An image capture device comprising:
- a housing;
- an integrated sensor and lens assembly, extending through a first wall of the housing, that is configured to capture a video;
- three or more microphones configured to capture sound in conjunction with capturing the video, wherein a first microphone is located on or within the first wall of the housing adjacent to the integrated sensor and lens assembly and a second microphone is located on or within a second wall that is located opposite the first wall; and
- a processor configured to:
  - monitor the sound captured by the three or more microphones;
  - divide the sound captured by the three or more microphones into individual frequency sub-bands;
  - estimate an azimuth and an elevation for the individual frequency sub-bands;
  - calculate angles for the individual frequency sub-bands based upon the azimuth, the elevation, or both;
  - estimate a direction of arrival of the sound captured by the three or more microphones based upon the angles for the individual frequency sub-bands from the sound captured by the three or more microphones; and
  - select one of the first microphone, the second microphone, or a third microphone of the three or more microphones with a lowest amount of wind noise based upon the sound captured by the three or more microphones.

9. The image capture device of claim 8, wherein the three of more microphones are located on or within the housing in a shape of a triangle.

10. The image capture device of claim 8, wherein the first wall comprising the first microphone is a rear wall, a top wall, or a forward wall of the housing, and wherein the third microphone is located on the top wall, the forward wall, or a side wall of the housing.

11. The image capture device of claim 10, wherein the three or more microphones are located in a straight line.

12. The image capture device of claim 8, wherein the processor is configured to calculate the angles for the individual frequency sub-bands by statistically calculating an angle of a given sound in each of the individual frequency sub-bands.

13. The image capture device of claim 12, wherein the processor is configured to calculate the angles by analyzing a time block from a single microphone or two or more of the three or more microphones.

14. The image capture device of claim 8, wherein the processor is configured to report the angles to provide a direction of sounds within a predetermined frequency range.

15. A method comprising:

capturing, with an integrated sensor and lens assembly of an image capture device, a video;

monitoring capture of microphone signals, during the capturing of the video, for three or more microphones in the image capture device, wherein a first microphone is located on a first wall of the image capture device and a second microphone is located on a second wall of the image capture device directly opposite the first wall;

applying beamforming delays and weights to the microphone signals based on microphone array geometry to determine a desired polar response;

reducing wind noise by switching the capture of the microphone signals between the three or more microphones or by combining the microphone signals captured by the three or more microphones;

estimating a direction of arrival of sound captured by the three or more microphones as the microphone signals; and generating frequency sub-bands from the microphone signals to determine a noise metric of the frequency sub-bands, wherein a frequency sub-band with a lowest noise metric is selected from the frequency sub-bands.

16. The method of claim 15, further comprising:

plotting frequencies of the sound captured to generate the desired polar response.

17. The method of claim 15, further comprising:

receiving the sound through a channel; and determining a signal to noise ratio (SNR) of the channel.

18. The method of claim 15, further comprising:

splitting the microphone signals to generate time blocks, and splitting the time blocks into the frequency sub-bands before estimating the direction of arrival of the sound.

19. The method of claim 15, further comprising:

processing the microphone signals to generate virtual audio channels.

20. The method of claim 19, further comprising:

combining the virtual audio channels into an audio stream.

* * * * *